Figure 1:
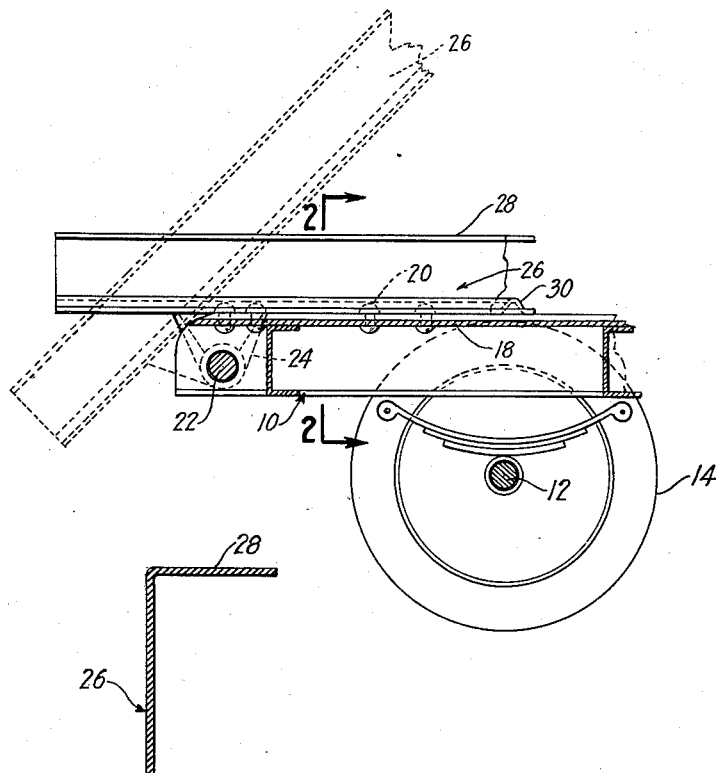

May 29, 1951  L. S. WOOD  2,555,263

TRUCK BODY SIDE RAIL

Filed Dec. 11, 1946

INVENTOR.
Louis S. Wood
BY
ATTORNEYS

Patented May 29, 1951

2,555,263

UNITED STATES PATENT OFFICE 2,555,263

TRUCK BODY SIDE RAIL

Louis S. Wood, Burlingame, Calif.

Application December 11, 1946, Serial No. 715,439

2 Claims. (Cl. 296—28)

This invention relates to truck bodies, and more particularly to a side rail structure for truck bodies.

In the manufacture of truck chassis frames, the side rails thereof are conventionally braced by transverse interconnecting members which are generally riveted to the side rails of the chassis. The rivet heads projecting above the upper surface of the side rails are variably positioned according to the particular manufacturer of the chassis frame and the size and type of the frame. When special dump type truck bodies are installed on a chassis frame, they are pivotally secured to the rearward portion of the side rails of the chassis, and the side rails of the body are supported on the side rails of the chassis when the body is in the down position. In order to have the chassis and body rails in abutting relation, it is customary to cut out portions of the body side rails in order that the rivet heads may pass therethrough so that the chassis and body rails may be in full contactural engagement, it being forbidden to cut the rivet heads off. Other makeshift expedients resorted to are the installation of wooden shims or runners recessed to receive the rivet heads, or the provision of elongated slots in the underside of the truck body side rails to accommodate the highest average number of rivet heads.

Due to the variable positioning of the rivet heads and the fact that truck bodies of one make may be installed on chassis frames built by diverse manufacturers, it is impossible for the truck body rails to be uniformly apertured so as to be adaptable to any chassis frame. Each body installation may present a special problem requiring a particular positioning of the side rail apertures. At best, the aperturing of the side rails results in a weakening of the truck body support structure.

The instant invention circumvents the above-described shortcomings of conventional methods of adapting truck body side rails to chassis side rails by providing a truck body side rail structure which is uniformly adaptable to any chassis side rail regardless of the positioning of the rivet heads, said structure providing for an overall increase in the strength of the side rail rather than a weakening thereof.

Among the objects of the invention, therefore, are the following: to provide a truck body side rail requiring no alteration in order to be adaptable to a chassis side rail, and to provide a truck body side rail of enhanced structural strength.

Figure 2:
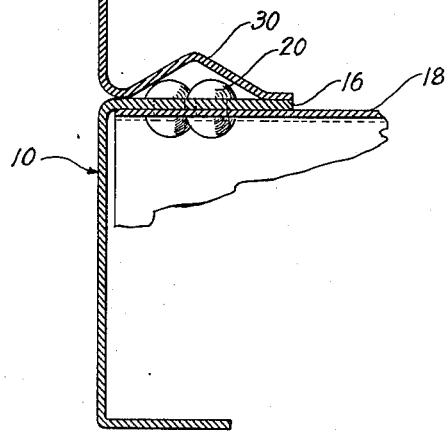

Other objects and advantages of the invention will be apparent from the following description when taken in conjunction with the drawing forming part of this specification, and in which:

Figure 1 is a partial view in elevation of a truck chassis frame having pivotally secured thereto the side rails of a body, not shown; and Figure 2 is a view in section taken along lines 2—2 of Figure 1.

Referring to the drawing for more specific details of the invention, 10 is one of a pair of chassis side rails spring supported on axles 12 supported by wheels 14. The side rails have flanges 16 interconnected by transverse reinforcing members 18 secured to the rails by rivets 20. A shaft 22 journalled in the side rails 10 pivotally supports a pair of spaced brackets 24 secured to side rails 26 of a truck body, not shown. The side rails 26 have upper flanges 28 adapted to be secured to the truck body, and the lower flange of each frame is uniformly shaped for the complete length thereof providing a concavely bent portion 30.

The bent portion 30 of the side rail provides for clearance of the rivets 20 regardless of the positioning of the rivets in the chassis rails 10, and, at the same time, the bent portion 30 of the side rail provides a measure of bracing in the lower flange of the side rail 26 to provide for an overall strengthened rail structure.

While the preferred embodiment of the invention has been shown and described, it is understood that the embodiment is subject to modification within the spirit of the invention and the scope of the appended claims.

What I claim as new and desire to secure by Letters Patent is:

1. A pair of rails in superimposed contactual relation, the interjacent surface of one of said rails being planar and having rivet heads extending outwardly therefrom, and the interjacent surface of the other of said rails being concavely bent medially to form a channel portion extending longitudinally of said rail, said planar interjacent surface being in contact with said other interjacent surface outwardly of the channel portion thereof and said rivet heads extending into the space defined by said planar surface and said channel portion.

2. A pair of rails in superimposed contactual relation, the interjacent surface of one of said rails being planar and having heads of securing means extending outwardly therefrom, and the interjacent surface of the other of said rails being concavely bent medially to form a channel portion extending longitudinally of said rail, said planar interjacent surface being in contact with said other interjacent surface outwardly of the channel portion thereof and said heads extending into the space defined by said planar surface and said channel portion.

LOUIS S. WOOD.

REFERENCES CITED

The following references are of record in the file of this patent:

UNITED STATES PATENTS

| Number | Name | Date |
|---|---|---|
| 846,787 | Foster | Mar. 12, 1907 |

FOREIGN PATENTS

| Number | Country | Date |
|---|---|---|
| 146,276 | Great Britain | Jan. 6, 1921 |
| 473,613 | Great Britain | Oct. 18, 1937 |
| 580,943 | Germany | July 19, 1933 |
| 814,534 | France | Mar. 22, 1937 |